United States Patent
Yamada et al.

(10) Patent No.: US 10,565,379 B2
(45) Date of Patent: Feb. 18, 2020

(54) SYSTEM, APPARATUS AND METHOD FOR INSTRUCTION LEVEL BEHAVIORAL ANALYSIS WITHOUT BINARY INSTRUMENTATION

(71) Applicant: Intel Corporation, Santa Clara, CA (US)

(72) Inventors: Koichi Yamada, Los Gatos, CA (US); Tugrul Ince, Santa Clara, CA (US); Paul A. Campbell, Santa Clara, CA (US); Jiunn-Yeu Chen, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 245 days.

(21) Appl. No.: 15/609,369

(22) Filed: May 31, 2017

(65) Prior Publication Data

US 2018/0349603 A1 Dec. 6, 2018

(51) Int. Cl.
*H04L 29/06* (2006.01)
*G06F 21/56* (2013.01)
*G06F 21/55* (2013.01)

(52) U.S. Cl.
CPC .......... *G06F 21/566* (2013.01); *G06F 21/554* (2013.01)

(58) Field of Classification Search
CPC ............. H04L 63/1416; H04L 63/1408; H04L 63/1441; H04L 63/1458; G06F 21/552
USPC ......................................................... 726/23
See application file for complete search history.

(56) References Cited

U.S. PATENT DOCUMENTS

| 9,569,613 B2 | 2/2017 | Yamada et al. |
| 2006/0090063 A1* | 4/2006 | Theis .................. G06F 8/4451 712/239 |
| 2016/0026581 A1* | 1/2016 | Muttik ................ G06F 12/1441 726/26 |
| 2016/0180079 A1 | 6/2016 | Sahita et al. |
| 2016/0180115 A1 | 6/2016 | Yamada et al. |
| 2017/0116418 A1 | 4/2017 | Shanmugavelayutham et al. |

FOREIGN PATENT DOCUMENTS

WO    WO2014189510    11/2014

OTHER PUBLICATIONS

U.S. Appl. No. 15/281,825, filed Sep. 30, 2016, entitled "System, Apparatus and Method for Performing On-Demand Binary Analysis for Detecting Code Reuse Attacks," by Tugrul Ince, et al.

* cited by examiner

*Primary Examiner* — Evans Desrosiers
(74) *Attorney, Agent, or Firm* — Trop, Pruner & Hu, P.C.

(57) ABSTRACT

In one embodiment, an apparatus includes an execution monitor to monitor an application in execution, identify a code region, generate region information for the code region, and analyze the code region to identify potential malicious behavior, and if the potential malicious behavior is identified, to alert a security agent, and otherwise to enable the code region to execute, where the execution monitor is isolated from the application. Other embodiments are described and claimed.

17 Claims, 5 Drawing Sheets

SYSTEM, APPARATUS AND METHOD FOR INSTRUCTION LEVEL BEHAVIORAL ANALYSIS WITHOUT BINARY INSTRUMENTATION

TECHNICAL FIELD

Embodiments relate to detection and protection against computer system attacks.

BACKGROUND

Instruction level runtime behavioral analysis can detect evasive malware attacks involving return oriented programming (ROP) attacks, providing high detection accuracy and a very low false positive rate. However, binary translation (BT) or instrumentation techniques used in such analysis incur overhead in dynamically instrumenting code for enabling runtime instruction level execution monitoring and detecting execution anomalies. In addition, other issues can also impact performance. For example, binary translation relies on code injection or just in time (JIT) compilation techniques to re-generate original code with security checks, which may become a potential attack surface from malware if not properly protected. In addition, dynamic code injection may not be possible when disallowed by a security policy for a given process.

Binary translation, which dynamically re-generates an instruction stream with in-lined security checks, can be complex, and may also compel runtime support for allocating and garbage collecting a translation cache (storage for re-generated code) during runtime, and may also require complex solutions for detecting self and cross-modifying code conditions to invalidate the translated code for correctness. In addition, binary translation techniques insert monitoring software inside the application itself, which may not be desirable when seeking complete secure isolation of security monitoring software.

DETAILED DESCRIPTION

Figure 1:
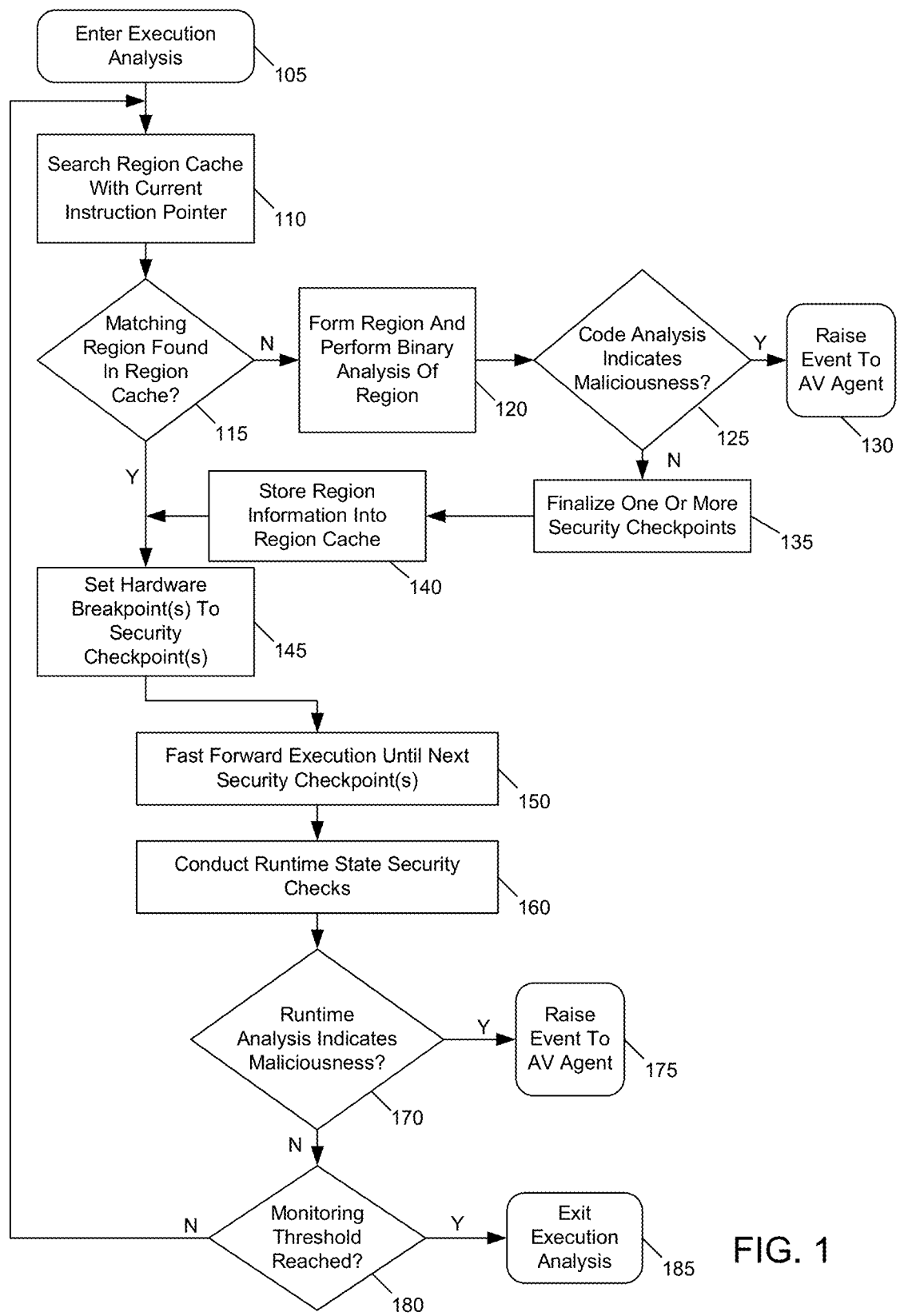
FIG. 1 is a flow diagram of a method in accordance with an embodiment of the present invention.

In various embodiments, techniques are provided to enable runtime instruction level execution monitoring without relying on a code injection technique. Such techniques may provide protection with minimal performance overhead and less implementation complexity than a code injection-based technique. As will be described in some cases, on-demand lightweight execution analysis (e.g., hardware or software event triggered) may use a runtime binary analysis technique to analyze a sequence of code for generating a control flow graph (CFG) and forming a code region with multiple exit points, prior to execution of at least this portion of the program.

Although the scope of the present invention is not limited in this regard, the behavioral analysis performed herein may be used to identify various malware exploits, such as ROP exploits, jump oriented programming (JOP) and call oriented programming (COP) attacks. For these and other examples, upon a given even trigger, binary analysis may be performed with low overhead, given that there is no binary translation or code injection performed.

After this analysis, processor hardware such as hardware breakpoint/branch profiling hardware can be used to cause the processor to fast forward the code execution until region exit points, which essentially become the security checkpoint for conducting behavioral analysis. In embodiments, a region can be formed large enough to contain a variety of control transfer instances such as if-else flows, a number of loops, case statements and even calls to functions. The processor can freely execute the region at native speed without any intervention from monitoring software. Multiple regions can also be connected together to form a large virtual region, which may eliminate the security checkpoints for connected regions, thus reducing the runtime overhead of instruction level execution monitoring. Trustable library calls can be whitelisted for security checks during execution analysis. For large regions, security checkpoints may use instruction tracing hardware to find and analyze execution within the region. To eliminate the recurrent overhead of code analysis for generating CFGs and region formation (including identifying region exit points), a region cache storage can be provided in some embodiments to save the region information for reuse in performing runtime execution monitoring on previously analyzed code.

In embodiments, execution analysis logic, also referred to herein as an execution monitor (which may be implemented as hardware circuitry, firmware, software, and/or combinations thereof), is adapted to perform instruction level execution analysis for malware detection. Such detection may include (but is not limited to): control flow integrity (CFI) checking; program state checking (e.g., stack bound, stack frame sanity, heap consistency check, etc.); calling and register convention checking; and instruction usage checking, etc. To this end, embodiments may further leverage various processor resources including debug and trace hardware resources. Such resources may include hardware breakpoints can be used to set breakpoints at security checkpoints. More specifically, hardware instruction breakpoints can be used to stop program execution at a next security checkpoint. Hardware data breakpoints may optionally be used for protecting memory locations that contain the indirect branch targets. Instruction trace hardware may be used for CFG analysis within the given executed region.

Execution analysis herein can be triggered by software or hardware events. Example software events include particular application programming interface (API) invocations and system activities. Example hardware events include events related to ROP heuristics such as counts indicating a mismatch between calls and returns (e.g., a statistically greater number of returns than calls).

In an embodiment, instruction level execution analysis starts with analyzing the instruction stream from a given instruction pointer (IP) and forming a region of code for analysis. In an embodiment, a code region can essentially be represented as a control flow graph of the code to be executed. Each region has at least one entry point and may have multiple exit points. The region exit points become security checkpoints for conducting runtime security analysis prior to executing the next region. The region can be built as large as possible to reduce the number of security checkpoints, hence minimizing the runtime overhead.

In an embodiment, a region former may stop growing a region during region formation when a branch target cannot be determined by just decoding the branch instruction itself (e.g., an indirect branch instruction). In other embodiments a region former also may implement dependency analysis for indirect branches, predict the target address and grow the region across indirect branches. Such analysis may occur in different situations. One situation is where a target address of the indirect branch is encoded in the instruction(s) prior to the indirect branch and is statically determinable, in which case that address is used to grow the region. Another situation is where an indirect branch refers to a memory location for obtaining the branch target and that memory location is statically determined. In that case, the value found in the memory location can be used as the target address. In these cases, memory disambiguation techniques may be applied to determine whether any store operations may occur to the memory location referred to by the indirect branch during the region execution. If the store dependency is not statically determinable, a hardware data breakpoint may be used to detect a write operation against that memory location. Then a hardware data breakpoint trap will detect a change of the predicted indirect branch target during runtime.

While detection of an indication of maliciousness can take different forms, examples include (but are not limited to) address range, code signing, CFI, calling and register conventions violations, stack access anomaly, detection of known malware code signatures, etc. Code analysis also may identify instructions that are to incur runtime security checks (e.g., instructions that can be used as stack pivot gadgets) and identify these instructions also as security checkpoints, where appropriate.

At a security checkpoint, the execution analysis logic may conduct a runtime state security check. Note that as the number of hardware breakpoints supported by a processor is finite, the size of a region may also be limited by the availability of the hardware breakpoint resources. Alternatively, hardware branch type filtering (BTF) (single step on branch) or other hardware capabilities can be used to fast forward execution until the security checkpoints.

At the security checkpoints, execution analysis may conduct a variety of runtime security checks. In an embodiment, such checks may include CFI checks prior to forward execution. These checks may determine the legitimacy of the indirect branch target when the security checkpoints are provided for indirect branches. Other checks include CFI checks on past execution when the past execution path is not verifiable, which may use instruction trace hardware for obtaining the instruction trace of the past execution and conducting CFG analysis. Other checks may include application state integrity checks such as stack bounds check, stack frame sanity check, function argument checks, heap memory integrity, etc., e.g., to detect stack pivot gadget execution and dynamic code injection attack.

Note that when a security checkpoint is set on an indirect branch instruction with a memory operand, the execution analysis logic may use single stepping hardware to single step the indirect branch and validate the target IP prior to executing the next region, to detect a time of check to time of use (TOCTTOU) attack that modifies the target address in memory.

In some embodiments, runtime overhead can be managed by certain optimizations. One optimization may include only triggering the execution analysis logic on given hardware heuristic and/or software events. In this way, execution monitoring is used selectively for providing deep analysis when hardware heuristic counters detect the execution anomaly or ensuring the execution integrity for critical application programming interface (API) paths, which can further be enhanced by terminating the execution monitoring after a threshold duration, e.g., a predefined number of cycle periods.

Another optimization is chaining, in which the execution analysis logic chains multiple regions together by removing the security checkpoints between two regions when the next region is determined to be legitimate after analysis. When an indirect branch separates two regions, a hardware data breakpoint may be used to protect and detect a change of the branch target in the memory location referred by the indirect branch. Chaining can be applied dynamically for frequently executed paths.

Whitelisting is another optimization in which a list or group of functions and libraries are identified that are selected to not be monitored during execution, so-called whitelisting. Such entities may be whitelisted when they are known to be trustable. When a listed item is encountered, the processor natively executes the whitelisted functions or/and libraries until return. Execution analysis logic may set a hardware instruction breakpoint at a return address to step over the whitelisted functions and libraries.

A still further optimization is fine grain execution monitoring configuration, which allows execution monitoring to be configurable to monitor specific behaviors. For instance, function calls can be treated as macro-execution (i.e., stepping over function calls) for ROP chain analysis after sanitizing the function call targets, letting function calls natively execute until their return without checkpoints.

As the region information stored in a region cache may possibly become stale if code is modified (e.g., self-modifying or cross-modifying code (SMC/XMC)) during runtime (e.g. JIT'ed code), embodiments may include region shape information as part of the region information stored in the region cache, which provides the code location and code byte information at the time of the region analysis. Detection of a SMC/XMC condition can be realized, in one embodiment, via byte-by-byte comparison operations between the code byte information stored in the region shape information and a target instruction stream. In such cases, this SMC/XMC check can be performed as part of the region cache lookup procedure when the target instruction stream is in a memory region for which code modification is allowed.

Referring now to FIG. 1, shown is a flow diagram of a method in accordance with an embodiment of the present invention. More specifically, method 100 illustrated in FIG. 1 is a method for performing instruction level behavioral analysis to identify possible malware or other malicious code. In embodiments, method 100 may be performed by an execution analysis logic, e.g., a binary analysis logic, which in embodiments may take the form of hardware circuitry, software, firmware and/or combinations thereof, such as implemented in one or more processors of a computing system.

As illustrated, method 100 begins by entering execution analysis (block 105). Such entry may occur during execution of a given application or other program on the computing system. In many embodiments, triggering of this instruction level behavioral analysis may occur in response to one or more of a variety of different triggering events. In any event, control passes from block 105 to block 110 where a region cache is searched. More specifically, this region cache, which stores region information for various regions of the application that have already been analyzed with a behavioral analysis, is searched with the current instruction pointer. Next it is determined whether the current instruction pointer hits within this region cache (diamond 115). In some embodiments, a hit may be predicated on a code comparison as described above to ensure that a given region has not been modified since the region was previously analyzed.

In the event that there is no matching region found in the region cache, control passes from diamond 115 to block 120. At block 120 a region formation may be performed. More specifically, a region former component of the binary analysis logic may form a region and perform a binary analysis of this region. As described herein, this region forming process may include identifying within code of the application and beginning at the current instruction pointer, entry points and exit points from the region. After region formation, a binary analysis is performed to identify whether the region entry address, region code address range and code sequence are associated with calling instructions, return instructions and other indirect branch operations used to enter to this analyzed region. Based on this analysis, it is determined at diamond 125 whether the code analysis indicates maliciousness. Such maliciousness may be determined in response to identification of an unexpected instruction sequence found in the region and one or more whitelisted or blacklisted target addresses of indirect branch operations, or so forth. For example, in some cases such whitelist or blacklist of indirect branch targets and configuration information of what to check for maliciousness indication may be used to determine potential maliciousness. If so, control passes to block 130 where a detection of malware may be indicated. In an embodiment, an indication of this detection may be realized by communicating a potential malware detection signal by raising an event to an antivirus agent, which may be a separate software component that executes within or otherwise is associated with the computing system.

If the code analysis indicates no maliciousness, control passes to block 135 where one or more security checkpoints may be finalized. Such finalization may ensure that the formed region is optimal in terms of size and number of security checkpoints. For example, the larger the region, the smaller the overhead will be. Note that in embodiments, the number of security checkpoint is equal or less than the number of hardware breakpoint resources. In an embodiment, these security checkpoints correspond to exit points of the code region. Next control passes to block 140 where region information may be stored into an entry of the region cache associated with this region.

In an embodiment, region information may include address information regarding a beginning and end of the region, an address of an entry point into the region and an address of one or more exit points of the region, which may correspond to the security checkpoints. Still further, this region information may contain region entry type and security checkpoint type. For example, if the region is entered through a CALL, the region entry type is CALL. If through a RET, it is RET, etc. This region entry type may be used to ensure that the region is always entered through the matching indirect branch operations (e.g., CALL, RET, JMP). Each security point has the address of the security checkpoint and the security checkpoint type defined. Security check point type may be used to indicate what runtime check is to be used to validate when a breakpoint is hit upon a security check.

Still with reference to FIG. 1, from both block 140 and diamond 115 (when there is a determination of a match in the region cache), control next passes to block 145. At block 145, one or more hardware breakpoints may be set to these security breakpoints for the region. In embodiments described herein, a processor of the computing system may include a hardware breakpoint storage, which may be implemented as a set of hardware breakpoint registers, each to identify a given address which, when encountered during program execution, causes a breakpoint in operation of the code under execution. In other cases, where a processor does not include a dedicated hardware breakpoint storage, understand that other registers or temporary storages may be used to store this security checkpoint information.

In any event, at this point execution of the application may be fast forwarded until the next security checkpoint (block 150). That is, the application is allowed to execute unfettered by the instruction level behavioral analysis described herein until the next breakpoint is reached. At this breakpoint time, control passes to block 160 where runtime state security checks may be conducted. Although the scope of the present invention is not limited in this regard, in an embodiment, such runtime state security checks may include CFI checks, program state checks, convention checks, and instruction usage checks.

After such checks are performed, control passes to diamond 170 to determine whether this runtime analysis indicates maliciousness. If so, control passes to block 175 where an event may be raised to an antivirus agent, as described above. Otherwise, control passes to diamond 180 to determine whether a monitoring threshold is reached. That is, in embodiments to reduce performance impact on actual application execution, a monitoring threshold, which may be set as a number of cycles during which the instruction level behavioral analysis may be performed, can be compared to the duration of the actual runtime analysis. If this threshold is reached, control passes to block 185 where execution analysis may exit. Otherwise, control passes back to block 110 discussed above. Understand while shown at this high level in the embodiment of FIG. 1, many variations and alternatives are possible.

Figure 2:
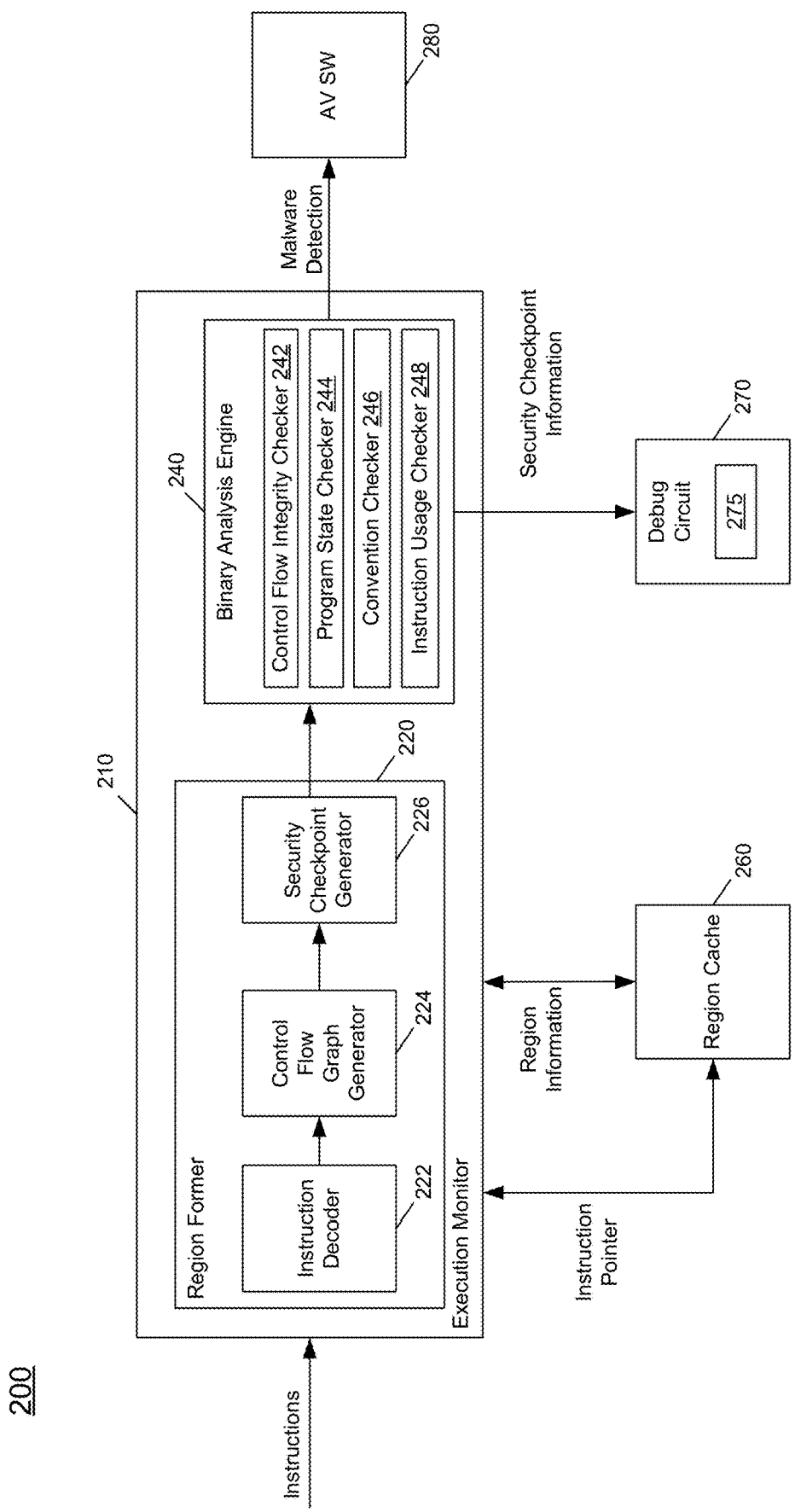
FIG. 2 is a block diagram of an environment in accordance with an embodiment of the present invention.

Referring now to FIG. 2, shown is a block diagram of an environment in accordance with an embodiment of the present invention. More specifically, environment 200 is part of a computing system that includes one or more processors such as multicore processors, memory, interface circuitry, mass storage and so forth. Of course understand that a given system includes more components than shown in the high level view of FIG. 2.

For performing the instruction level binary analysis without binary instrumentation as described herein, environment 200 includes an execution monitor 210. In various embodiments, execution monitor 210 may be implemented in hardware circuitry, firmware, software and/or combinations thereof. As seen, execution monitor 210 receives incoming instructions (e.g., along with corresponding instruction pointers). Based on the instruction pointers, and when enabled for analysis of a given application or portion thereof, execution monitor 210 identifies a region of code to be analyzed. To this end, a region former 220 may first determine whether incoming instructions are associated with an already-formed region for which region information is stored in a region cache 260. This determination may be based on a lookup of region cache 260 based on an instruction pointer. If region information is present, it is provided from a given entry of region cache 260 to execution monitor 210, and more specifically to a binary analysis engine 240, details of which are described further below.

Otherwise, when region information for an already-formed region is not available, incoming instructions are provided to an instruction decoder 222 of region former 220. Instruction decoder 222 may decode instructions, where these decoded instructions are provided to a control flow graph generator 224. More specifically, control flow graph generator 224 may be adapted to generate a CFG based on analysis of the code to identify various direct or indirect branches within the code. From the generated CFG, a security checkpoint generator 226 may identify a set of checkpoints for the region. More specifically, these checkpoints may correspond to entry points into and exit points from the region. As will be described herein, these security checkpoints may be stored in an entry for this region in region cache 260 as part of the region information.

Still with reference to FIG. 2, after formation of a region, either statically prior to code execution or dynamically during execution as triggered by a checkpoint trigger, binary analysis engine 240 may analyze the region's code to confirm that no maliciousness is present. In embodiments, various independent logics may be implemented within binary analysis engine 240. Depending upon the type of code and information available, binary analysis engine 240 may perform a variety of different checks. More specifically as illustrated in FIG. 2, binary analysis engine 240 may include a control flow integrity checker 242, a program state checker 244, a convention checker 246 and an instruction usage checker 248. Based on the results of these various checks performed within binary analysis engine 240, should an indication of malware be identified, a malware detection signal is sent to an antivirus software 280. In various embodiments, this software may be a security suite or other security agent, e.g., of a third party independent software vendor, an OS-based antivirus suite or so forth.

As further illustrated in FIG. 2, prior to executing a given region of code during runtime, identified checkpoints for the region may be obtained, e.g., from region cache 260 and used to program debug hardware within a debug circuit 270. More specifically, debug circuit 270 may include a set of debug storages 275, e.g., debug registers, which may store these identified checkpoints, such that when an instruction to be executed has an instruction pointer matching one of the checkpoints, execution is stopped and runtime instruction level behavioral analysis may be performed within binary analysis engine 240. Understand while shown at this high level in the embodiment of FIG. 2, many variations and alternatives are possible.

Figure 3:
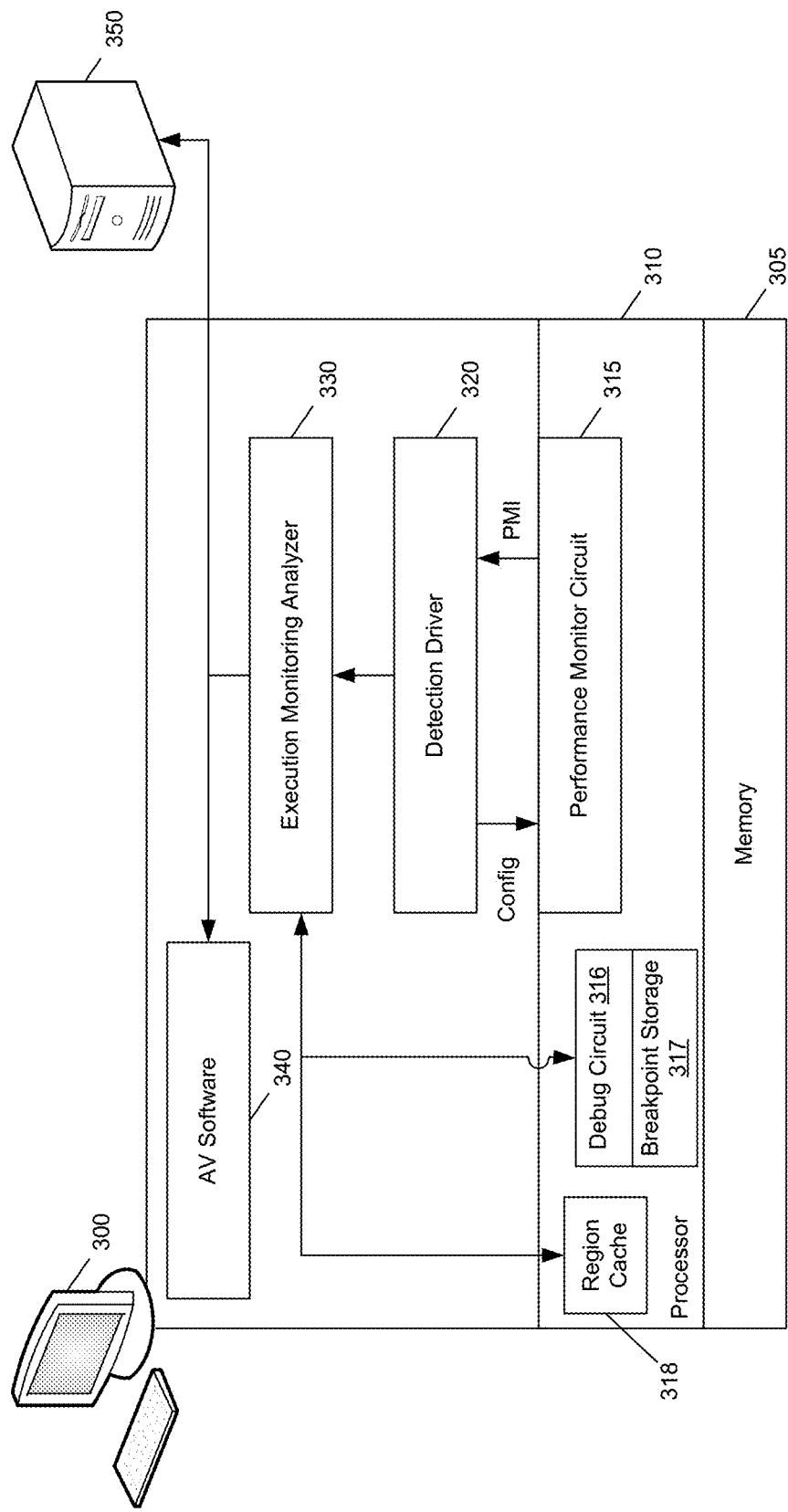
FIG. 3 is a block diagram of a system according to one embodiment.

FIG. 3 is a block diagram of a system implementing a binary analysis technique (without binary translation) according to one embodiment. As illustrated, computer system 300 includes a processor 310 that provides hardware counters that may be useful for malware detection by the hardware. Note that in embodiments, various processor hardware such as ROP detection hardware counters, a last branch record (LBR) recording facility, performance monitoring unit (PMU), processor trace, and dedicated ROP heuristic detection hardware may be used to detect branch discrepancies such as RET/CALL bias, return mispredicts, indirect branch mispredicts, etc. to trigger execution monitoring as described herein. Note that in different embodiments hardware may be specific to ROP and/or other malware detection or hardware counters may be configured for various purposes including security detection, or both. Different models of processors may deploy different types of hardware counters.

A memory 305 coupled to processor 310 may be used for storage of information related to the detection and analysis techniques described herein. Memory 305 also may store instructions that when executed cause system 300 to execute one or more of a detection driver 320, an execution monitoring analyzer 330, and an anti-malware or security software (generally antivirus (AV) software) 340.

In an embodiment, processor 310 includes a performance monitor circuit 315 having, e.g., one or more ROP heuristic detection hardware counters and other hardware counters to detect anomalies of branch executions such as RET/CALL bias which may be used to return mispredicts, indirect branch mispredicts, far branches, etc. Note that when dedicated ROP heuristic hardware does not exist on a processor, a set of model specific performance monitoring counters may be used.

As further illustrated in FIG. 3, processor 300 further includes a region cache 318. As described herein, region cache 318 may be configured to store region information for already-analyzed regions. Region cache 318 may eliminate the recurrent overhead of code analysis by a region former. As such, region information stored in region cache 318 can be reused for execution analysis for the already-analyzed code regions. Thus, region formation and code analysis only occur when there is a miss in the region cache 318. Understand that while in the embodiment of FIG. 3 region cache 318 is shown as being included within processor 310, in other cases the main storage for region information may be a storage allocated within memory 305. More specifically, in embodiments the bulk of region information is stored in this allocated memory or cache within memory 305, and only most frequently and/or recently used region information entries may be stored within region cache 318, which may more generally be one or more levels of a cache hierarchy of processor 310.

In addition, processor 310 further includes a debug circuit 316, which may be used in various debug operations. For use as described herein, debug circuit 316 may include a breakpoint storage 317, e.g., one or more breakpoint registers, which may be programmed with security checkpoints as determined for a given region, to cause execution of an application to break for analysis in execution monitoring analyzer 330 upon hitting a given checkpoint.

Detection driver 320 may be used to configure ROP (or other malware) heuristic detection hardware counters and interface with execution monitoring analyzer 330 to signal a branch anomaly event or any other kind of code flow anomaly (for example, a stack pointer modification). In turn, execution monitoring analyzer 330 provides instruction-level execution runtime analysis, which may execute after a given trigger event to apply a variety of instruction-level execution analysis methods as described herein to make a final decision (e.g., potential malware detection). As further illustrated, execution monitoring analyzer 330 may store region information in region cache 318 and further may program breakpoint storage 317 of debug circuit 316 for selected checkpoints of an upcoming code region that is to be executed.

Finally, AV software 340 may be used to configure execution monitoring analyzer 330 through software interfaces (e.g., APIs). AV software 340 may receive a notification callback from execution monitoring analyzer 330 upon detection of malware activity and take a security measure against the attack (e.g., according to a given security policy). System 300 may be any type of computing device, such as, for example, a smartphone, smart tablet, personal digital assistant (PDA), mobile Internet device, convertible tablet, notebook computer, desktop computer, server, or smart television.

As embodiments operate without any dynamic code injection to an application, the execution analysis logic itself can be isolated from the target application. For example, this execution analysis logic can be located inside ring 0 kernel code for monitoring the application code, as part of a separate security service process, or inside a virtual machine monitor (VMM) (e.g., a secure hypervisor) for monitoring the guest operating system (OS) and application code.

Embodiments thus enable runtime behavioral ROP and other code reuse malware detection, without any binary translation or other code injection technique. In an embodiment, runtime binary analysis techniques are used to form a code region with CFG analysis and identify runtime security checkpoints. Thereafter, security analysis may occur to the identified code region to detect any indication of maliciousness (e.g., CFI violation, register convention violations, instruction level malware signature, etc.) and add additional security checkpoints where needed. For runtime analysis, hardware breakpoint and branch trapping capability may be used to fast forward the execution until the next security checkpoints. At this point, CFI and application state integrity checks may be performed at these security checkpoints during runtime. Instruction trace hardware may be used for obtaining the instruction trace of the past execution and conducting CFG analysis when the past execution is not verifiable. The region cache storage may store the generated region information containing security checkpoints and maliciousness scoring for reuse as to already analyzed code areas, eliminating recurrent binary analysis overhead. Various techniques may be applied (e.g., large region creation, chaining, whitelisting, etc.) to reduce the number of checkpoints and manage the runtime overhead. Further, hardware events (e.g., heuristic hardware counters) and software events (e.g., API calls) may be used to trigger this instruction level behavioral analysis. For example, ROP heuristic counters may detect instruction level anomaly and generate a performance monitoring interrupt. In turn, embodiments can be used for analyzing the binary to determine if it is a real exploit or false positive upon such events.

Implementations of embodiments can be adopted in different ways. For example, embodiments may be implemented as software development kits such as a threat management software development kit (SDK) to be associated with security ISV solutions and/or OSV solutions. Note that embodiments may be used to monitor ring 0 code, which cannot easily be done with BT-based solutions. And without BT inclusion, embodiments may be used even when applications execute with an OS dynamic code disabled policy.

Figure 4:
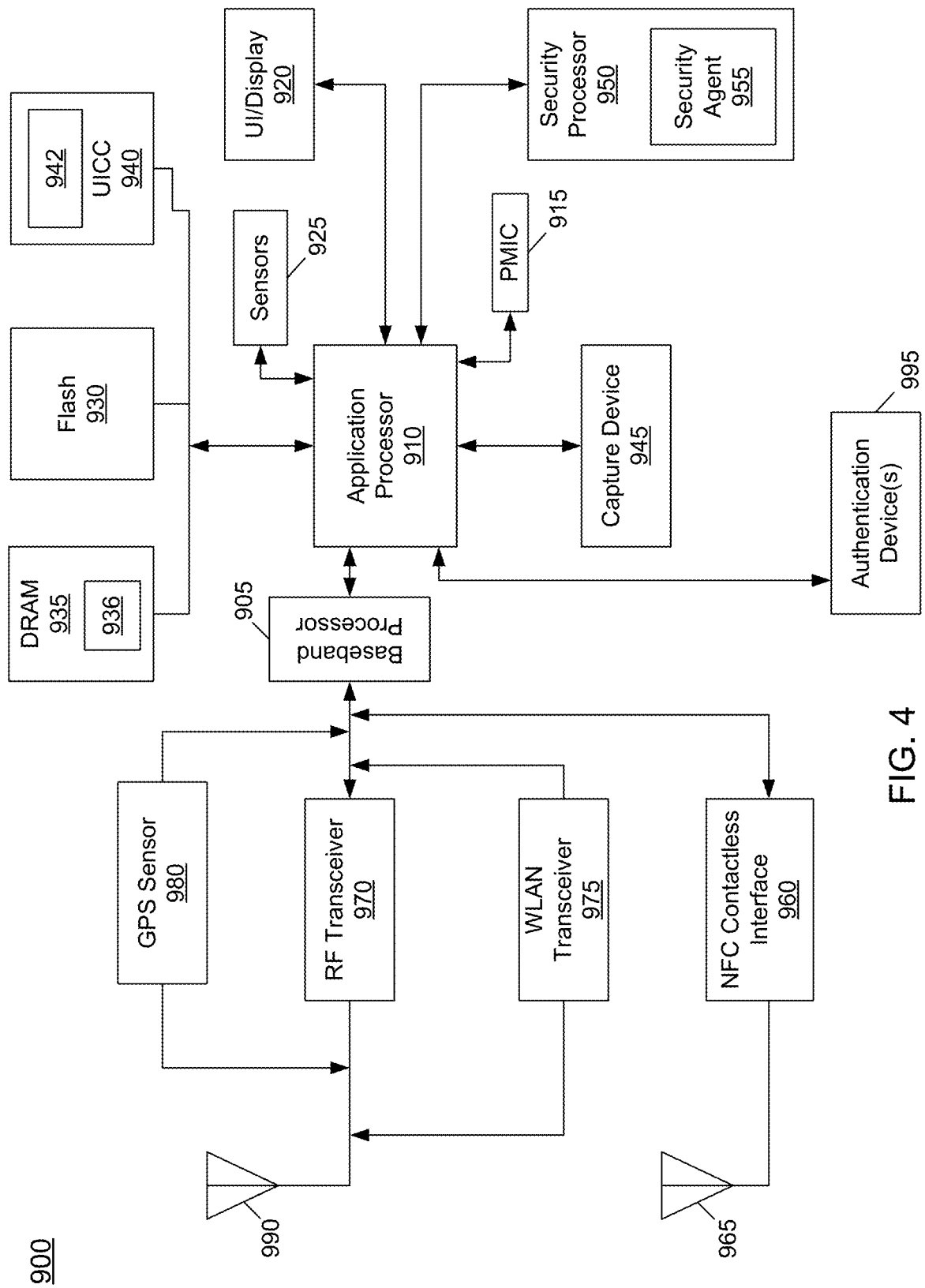
FIG. 4 is a block diagram of an example system with which embodiments can be used.

Referring now to FIG. 4, shown is a block diagram of an example system with which embodiments can be used. As seen, system 900 may be a smartphone or other wireless communicator or any other Internet of Things (IoT) device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device. As described herein, application processor 910 may include circuitry, when triggered, to perform runtime binary analysis of an application without binary translation or instrumentation of the application.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, DRAM 935 may include a cache memory 936 in which region information, whitelists, blacklists, and other sensitive information may be stored. As further seen, application processor 910 also couples to a capture device 945 such as one or more image capture devices that can record video and/or still images.

Still referring to FIG. 4, a universal integrated circuit card (UICC) 940 comprises a subscriber identity module, which in some embodiments includes a secure storage 942 to store secure user information. System 900 may further include a security processor 950 that may implement a trusted execution environment (TEE), and which may couple to application processor 910. In one embodiment, security processor 950 may include a security agent 955 configured to receive indications of potential malicious activity, as indicated by an execution monitor, as described herein.

Furthermore, application processor 910 may implement a secure mode of operation, such as Intel® SGX for hosting of a TEE. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 4, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more wireless networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 5:
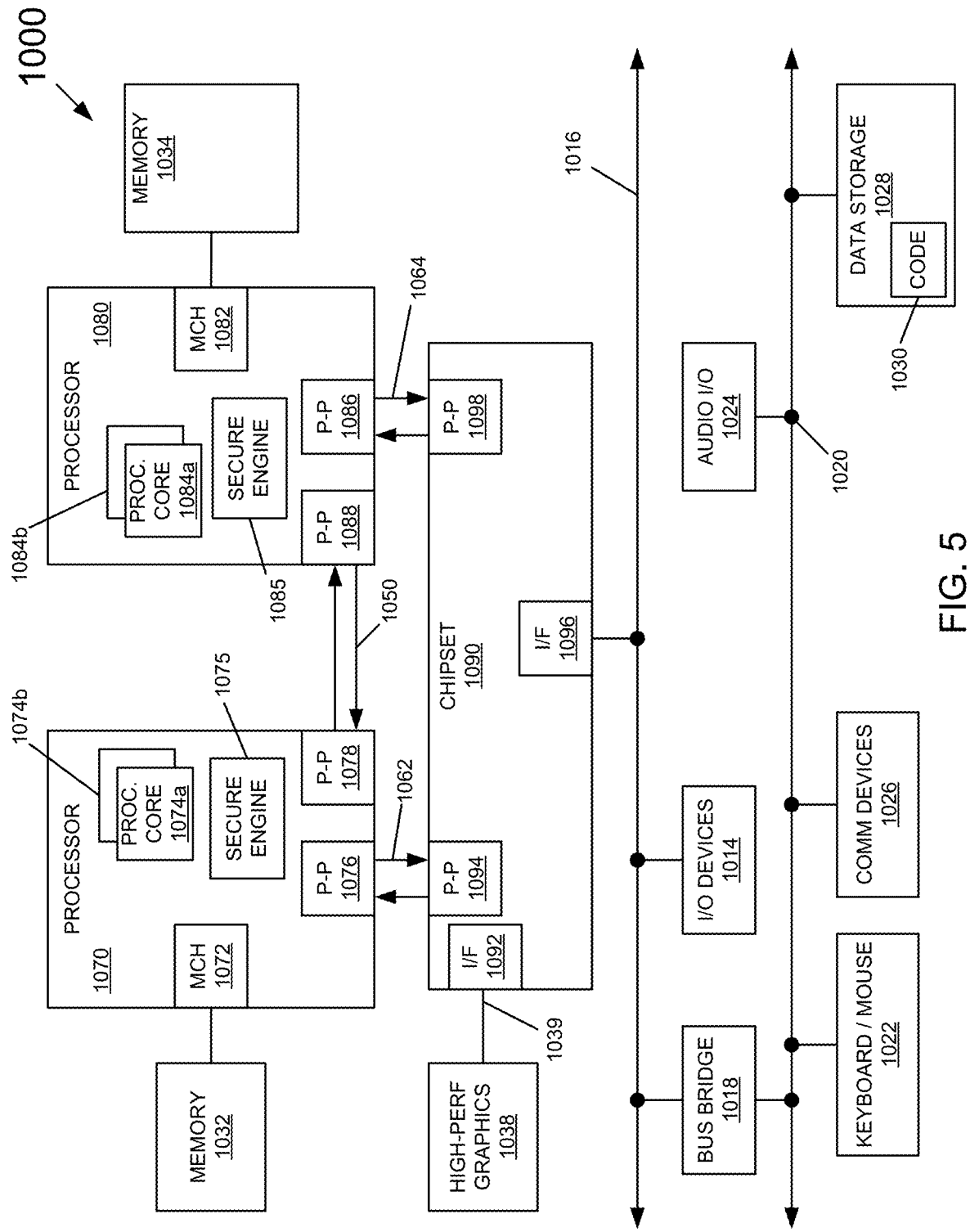
FIG. 5 is a block diagram of a system in accordance with another embodiment of the present invention.

Referring now to FIG. 5, shown is a block diagram of a system in accordance with another embodiment of the present invention. As shown in FIG. 5, multiprocessor system 1000 is a point-to-point interconnect system such as a server system, and includes a first processor 1070 and a second processor 1080 coupled via a point-to-point interconnect 1050. As shown in FIG. 5, each of processors 1070 and 1080 may be multicore processors such as SoCs, including first and second processor cores (i.e., processor cores 1074*a* and 1074*b* and processor cores 1084*a* and 1084*b*), although potentially many more cores may be present in the processors. In addition, processors 1070 and 1080 each may include a secure engine 1075 and 1085 to perform runtime binary analysis with low overhead, as described herein.

Still referring to FIG. 5, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 5, MCH's 1072 and 1082 couple the processors to respective memories, namely a memory 1032 and a memory 1034, which may be portions of main memory (e.g., a DRAM) locally attached to the respective processors. As illustrated, memories 1032, 1034 each include one or more execute-only regions 1033, 1035 to be provisioned for use in secure communication between applications. First processor 1070 and second processor 1080 may be coupled to a chipset 1090 via P-P interconnects 1052 and 1054, respectively. As shown in FIG. 5, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 5, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

The following Examples pertain to further embodiments.

In Example 1, a method comprises: obtaining, from a region cache, region information for a code region of an application to be executed on at least one processor of a system; storing one or more security checkpoints of the region information in one or more breakpoint storages of the at least one processor; enabling the application to execute until a first checkpoint of the one or more security checkpoints is reached; in response to the first checkpoint being reached, performing a runtime security check on the application to determine potential malicious activity; and in response to detection of the potential malicious activity, sending a detection notification to a security agent.

In Example 2, the method further comprises obtaining the region information in response to an event trigger during execution of the application.

In Example 3, the event trigger comprises a hardware heuristic trigger.

In Example 4, the method further comprises: identifying an entry point to the code region and at least one exit point from the code region; and forming a control flow graph using the entry point and the at least one exit point.

In Example 5, the method further comprises extending the code region formation to include one or more chained additional code regions.

In Example 6, the method further comprises, in response to no detection of the potential malicious activity, performing the runtime security check on one or more other code regions of the application, until an end of a monitoring cycle period.

In Example 7, the region information includes region shape information, and the method further comprises comparing the region shape information to a target instruction stream of the code region to confirm that the code region has not been modified during runtime.

In Example 8, the method further comprises executing a second code region of the application without the runtime security check, in response to an identification of the second code region within a whitelist.

In Example 9, the method further comprises utilizing execution analysis software isolated from the application to perform the runtime security check, the application uninstrumented and untranslated.

In Example 10, the method further comprises, in response to the detection of the potential malicious activity, pausing execution of the application.

In Example 11, a computer-readable storage medium includes computer-readable instructions, when executed, to implement a method as claimed in any one of the above Examples.

In Example 12, an apparatus comprising means to perform a method as claimed in any one of the above Examples.

In Example 13, an apparatus comprises: an execution monitor to monitor an application in execution, identify a code region, generate region information for the code region, and analyze the code region to identify potential malicious behavior, and if the potential malicious behavior is identified, to alert a security agent, and otherwise to enable the code region to execute; a cache memory having a plurality of entries each to store region information for a code region analyzed by the execution monitor; and a debug circuit including a breakpoint storage, where the execution monitor is to cause one or more security checkpoints of the region information to be stored in the breakpoint storage prior to the execution. The debug circuit may trigger the execution monitor in response to the execution reaching at least one of the one or more security checkpoints stored in the breakpoint storage.

In Example 14, the execution monitor is to analyze the code region in response to an event trigger during the execution of the application.

In Example 15, the execution monitor is to: identify an entry point to the code region and at least one exit point from the code region; and form a control flow graph using the entry point and the at least one exit point.

In Example 16, the apparatus further comprises a storage to store a whitelist of one or more code regions for which execution is to proceed without analysis by the execution monitor.

In Example 17, the apparatus further comprises a security component including the execution monitor, where the security component is of a first protection level and the application is of a second protection level, the second protection level lower than the first protection level.

In Example 18, a system comprises: a processor and a system memory coupled to the system memory. The processor may have: one or more cores; a cache memory having a plurality of entries each to store region information for a code region of a program; and a debug circuit including a breakpoint storage to store one or more breakpoints, where in response to an instruction pointer corresponding to a value stored in the breakpoint storage, the debug circuit is to halt execution of the program and trigger an execution monitor of a binary analysis logic isolated from the program to analyze one or more code regions of the program. In turn, the system memory is to store instructions that when executed enable the execution monitor to obtain, from the cache memory, region information for a first code region of the program, perform a runtime security check on the first code region to determine potential malicious activity based at least in part on the region information for the first code region, the runtime security check including one or more of a control flow integrity check, a program state check, a convention check and an instruction usage check, and in response to detection of the potential malicious activity send a detection notification to a security agent, the security agent isolated from the binary analysis logic.

In Example 19, the execution monitor is to identify an entry point to the first code region and at least one exit point from the first code region, and form a control flow graph using the entry point and the at least one exit point.

In Example 20, the execution monitor is to store the region information for the first code region into the cache memory, the region information including the entry point and the at least one exit point.

In Example 21, the region information for the first code region includes region shape information of the first code region, and the execution monitor is to compare the region shape information to a target instruction stream of the first code region to confirm that the first code region has not been modified during runtime.

In Example 22, the system further comprises a storage to store a whitelist, where the system is to execute a second code region of the program without the runtime security check in response to an identification of the second code region within the whitelist.

In Example 23, an apparatus comprises: execution monitoring means for monitoring an application in execution; means for identifying a code region in the application; means for generating region information for the code region; means for analyzing the code region to identify potential malicious behavior; means for alerting a security agent in response to identifying the potential malicious behavior; storage means for storing region information for a code region of the application; and debug means for triggering the execution monitoring means in response to execution of the application reaching at least one security checkpoint associated with the debug means.

In Example 24, the execution monitoring means is to analyze the code region in response to an event trigger during the execution of the application.

In Example 25, the execution monitoring means is to: identify an entry point to the code region and at least one exit point from the code region; and form a control flow graph using the entry point and the at least one exit point.

In Example 26, the apparatus further comprises second storage means for storing a whitelist of one or more code regions for which execution is to proceed without analysis by the execution monitoring means.

In Example 27, the debug means comprises breakpoint storage means for storing one or more security checkpoints of the region information.

Understand that various combinations of the above Examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one computer readable storage medium comprising instructions that when executed enable a system to:
   obtain, from a region cache, region information for a code region of an application to be executed on at least one processor of the system;
   identify an entry point to the code region and at least one exit point from the code region;
   form a control flow graph using the entry point and the at least one exit point;
   store one or more security checkpoints of the region information in one or more breakpoint storages of the at least one processor, the one or more security checkpoints to identify an instruction at which a runtime security check is to be performed;
   enable the application to execute until a first checkpoint of the one or more security checkpoints is reached;
   in response to the first checkpoint being reached, perform the runtime security check on the application to determine potential malicious activity; and
   in response to detection of the potential malicious activity, send a detection notification to a security agent.

2. The at least one computer readable storage medium of claim 1, further comprising instructions that when executed enable the system to obtain the region information in response to an event trigger during execution of the application.

3. The at least one computer readable storage medium of claim 2, wherein the event trigger comprises a hardware heuristic trigger.

4. The at least one computer readable storage medium of claim 1, further comprising instructions that when executed enable the system to extend the code region formation to include one or more chained additional code regions.

5. The at least one computer readable storage medium of claim 1, further comprising instructions that when executed enable the system to, in response to no detection of the potential malicious activity, perform the runtime security check on one or more other code regions of the application, until an end of a monitoring cycle period.

6. The at least one computer readable storage medium of claim 1, wherein the region information includes region shape information comprising code location information and code byte information, and further comprising instructions that when executed enable the system to compare the region shape information to a target instruction stream of the code region to confirm that the code region has not been modified during runtime.

7. The at least one computer readable storage medium of claim 1, further comprising instructions that when executed enable the system to execute a second code region of the application without the runtime security check, in response to an identification of the second code region within a whitelist.

8. The at least one computer readable storage medium of claim 1, further comprising instructions that when executed enable the system to utilize execution analysis software isolated from the application to perform the runtime security check, the application uninstrumented and untranslated.

9. The at least one computer readable storage medium of claim 1, further comprising instructions that when executed enable the system to, in response to the detection of the potential malicious activity, pause execution of the application.

10. An apparatus comprising:
an execution monitor to monitor an application in execution, identify a code region, generate region information for the code region, identify an entry point to the code region and at least one exit point from the code region, form a control flow graph using the entry point and the at least one exit point, and analyze the code region to identify potential malicious behavior, and if the potential malicious behavior is identified, to alert a security agent, and otherwise to enable the code region to execute;
a cache memory having a plurality of entries each to store region information for a code region analyzed by the execution monitor; and
a debug circuit including a breakpoint storage, wherein the execution monitor is to cause one or more security checkpoints of the region information to be stored in the breakpoint storage prior to the execution, the one or more security checkpoints to identify an instruction at which a runtime security check is to be performed, wherein the debug circuit is to trigger the execution monitor in response to the execution reaching at least one of the one or more security checkpoints stored in the breakpoint storage.

11. The apparatus of claim 10, wherein the execution monitor is to analyze the code region in response to an event trigger during the execution of the application.

12. The apparatus of claim 10, further comprising a storage to store a whitelist of one or more code regions for which execution is to proceed without analysis by the execution monitor.

13. The apparatus of claim 10, further comprising a security component including the execution monitor, wherein the security component is of a first protection level and the application is of a second protection level, the second protection level lower than the first protection level.

14. A system comprising:
a processor having:
one or more cores;
a cache memory having a plurality of entries each to store region information for a code region of a program; and
a debug circuit including a breakpoint storage to store one or more breakpoints, wherein in response to an instruction pointer corresponding to a value stored in the breakpoint storage, the debug circuit is to halt execution of the program and trigger an execution monitor of a binary analysis logic isolated from the program to analyze one or more code regions of the program; and
a system memory coupled to the processor, the system memory to store instructions that when executed enable the execution monitor to obtain, from the cache memory, region information for a first code region of the program, identify an entry point to the first code region and at least one exit point from the first code region, form a control flow graph using the entry point and the at least one exit point, perform a runtime security check on the first code region to determine potential malicious activity based at least in part on the region information for the first code region, the runtime security check including one or more of a control flow integrity check, a program state check, a convention check and an instruction usage check, and in response to detection of the potential malicious activity send a detection notification to a security agent, the security agent isolated from the binary analysis logic.

15. The system of claim 14, wherein the execution monitor is to store the region information for the first code region into the cache memory, the region information including the entry point and the at least one exit point.

16. The system of claim 14, wherein the region information for the first code region includes region shape information of the first code region comprising code location information and code byte information, and wherein the execution monitor is to compare the region shape information to a target instruction stream of the first code region to confirm that the first code region has not been modified during runtime.

17. The system of claim 14, further comprising a storage to store a whitelist, wherein the system is to execute a second code region of the program without the runtime security check in response to an identification of the second code region within the whitelist.

* * * * *